Nov. 5, 1935.         DE HART G. SCRANTOM         2,019,636
                        COLLAPSIBLE CONTAINER
                        Filed Oct. 11, 1933         2 Sheets-Sheet 1
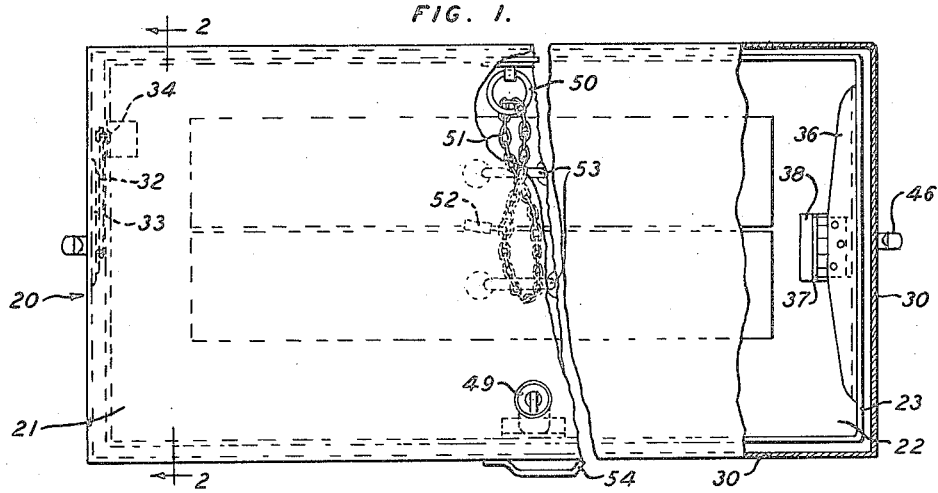
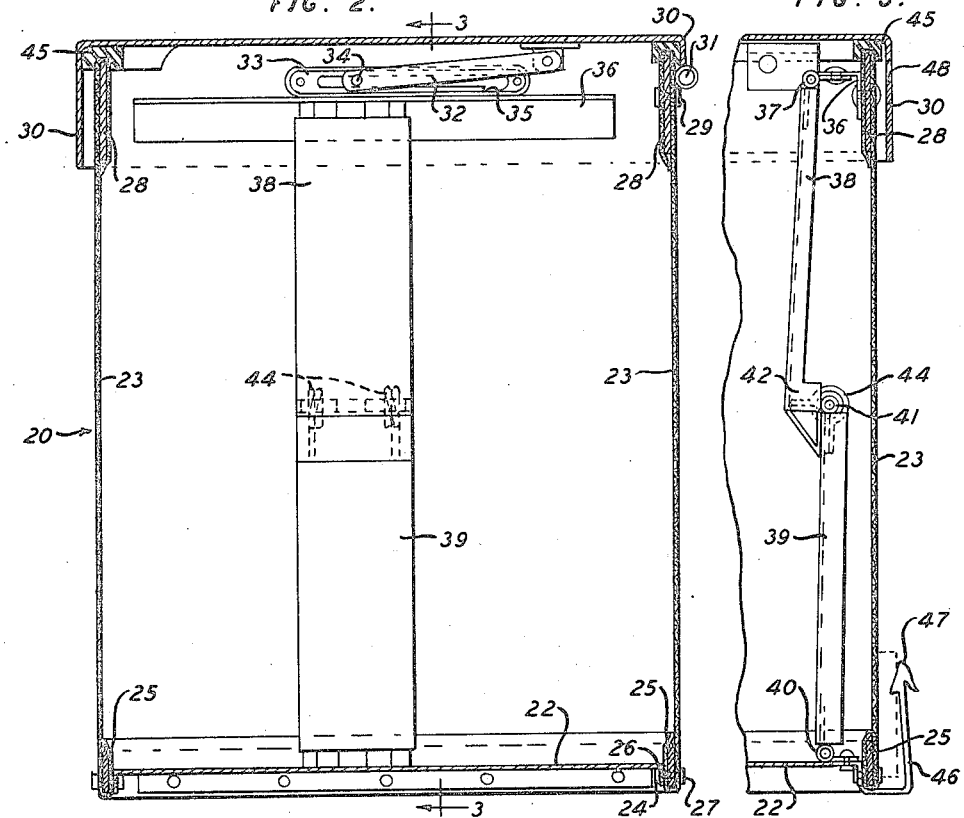
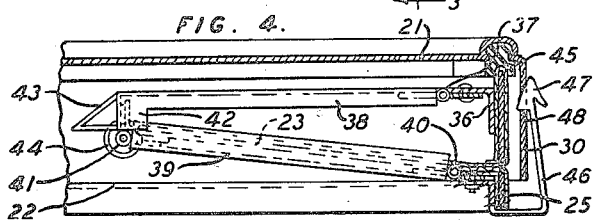
INVENTOR
D. G. SCRANTOM.
BY E. R. Nowlan
ATTORNEY Nov. 5, 1935.  DE HART G. SCRANTOM  2,019,636
COLLAPSIBLE CONTAINER
Filed Oct. 11, 1933   2 Sheets-Sheet 2

INVENTOR
D. G. SCRANTOM
BY
E. R. Nowlan
ATTORNEY

Patented Nov. 5, 1935

2,019,636

UNITED STATES PATENT OFFICE 2,019,636

COLLAPSIBLE CONTAINER

De Hart G. Scrantom, Maplewood, N. J., assignor to Western Electric Company, Incorporated, New York, N. Y., a corporation of New York Application October 11, 1933, Serial No. 693,047

2 Claims. (Cl. 150—50)

This invention relates to a collapsible container and more particularly to a collapsible container adapted for use as a luggage carrier on an automobile.

An object of the invention is to provide a collapsible container for use as a luggage carrier on an automobile, which shall be simple in construction, light in weight and neat in appearance.

Another object is to provide such a luggage carrier which may be collapsed or folded when empty into a neat and inconspicuous package.

Another object is to provide means whereby such a luggage carrier when collapsed may be disposed out of sight within the body of an automobile in a simple and handy fashion.

One embodiment of the invention presents a parallelopipedal container having a rigid bottom, flexible side walls terminating upwardly in a rigid hoop and a rigid top hinged to the hoop. The top and bottom are held apart when the container is expanded by one or more toggle like hinges extending between the bottom and the hoop and arranged as hereinafter described so that when the container is collapsed the flexible side walls find space to fold inwardly between the spaced folded arms of the hinges. The top or cover has a peripheral turned down flange which encloses the folded sides and bottom when collapsed. It is proposed to combine such a container with an automobile or other vehicle body having a recess adapted to receive and more or less conceal the container when collapsed together with means to support the expanded container externally of the vehicle body.

These and other objects and features of the invention will be apparent from the following detailed description of several forms of one embodiment thereof taken in connection with the attached drawings in which identical reference numerals are applied to the same or homologous parts in the several figures and in which Fig. 1 is a broken plan view of an expanded collapsible container embodying the invention;

Fig. 2 is an enlarged view in vertical section on the line 2—2 of Fig. 1;

Fig. 3 is a similar view on the line 3—3 of Fig. 2;

Fig. 4 is a similar view showing the container collapsed;

Figure 5:
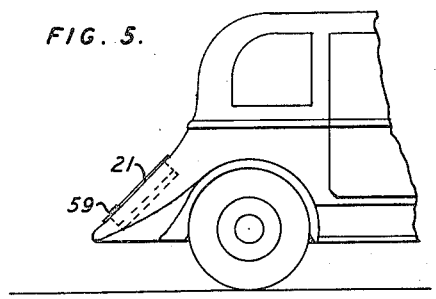
Fig. 5 is a small scale view in elevation of the container as combined with an automobile body when collapsed.

One embodiment of the invention as herein disclosed comprises a generally parallelopipedal container, generally indicated by the reference numeral 20, and provided with a hinged top or lid 21. The body of the container has a rigid, substantially rectangular bottom 22, and flexible side and end walls 23, these side and end walls being preferably made of one piece of flexible, waterproof and dustproof material. This material may, for example, consist of a central lamina of sheet rubber or the like having a facing of canvas, duck, or the like cemented to either side thereof, or it might consist of a single layer of heavy canvas or duck which has been treated with materials containing paraffin, rubber, alum, or other waterproofing compounds.

As here shown the bottom 22, of one piece of sheet metal, has a continuous downwardly extending integral flange 24 formed around its periphery and an external endless band preferably of metal 25 encircles the outer face of the flange. The walls 23 at their lower edges fit snugly over the outside of the band 25 and are folded around the bottom edge thereof and brought up between the band 25 and the flange 24 as shown at 26. Rivets 27 hold the flange, interposed canvas, band and external canvas securely together making a water and dustproof joint between the bottom and side walls. If desired, the tightness of this joint may be further ensured by applying cement to the juxtaposed parts before assembly or to the joint subsequent to assembly.

The top edge of the side and end walls is spread and supported by an endless rigid hoop 28 also preferably of metal, the walls 23 extending up over the outer face of the hoop and being folded over the top and down over the inner face of the hoop and fastened by rivets 29. Here also the side walls may, if desired, be cemented to the hoop as well as attached thereto by rivets.

The lid 21 is essentially an inverted tray preferably pressed from a single sheet of metal having a downwardly extending integral peripheral flange 30 relatively wide at the front and ends and relatively narrow at the rear. This lid is hinged to the hoop 28 at the bottom of the rear flange 30 as shown at 31 in Fig. 2. The hinge 31 may extend the entire length of the rear flange 30 or may comprise two or more short hinges appropriately spaced. The part of the hinge attached to the lid may be formed integrally from the material of the flange or may be separately made and attached thereto as by welding or riveting.

A link 32 may be pivoted to the lid and carry a pin 34 to coact with a slotted slide 33 fastened in any approved fashion as by rivets to the inner face of an end of the hoop 28 to prevent the lid from falling too far back when opened and if the slot of the slide be provided with an appropriately formed notch 35 to hold the lid against falling shut accidentally.

An angle iron member 36 is fastened horizontally as by rivets to the inner face of one end of the hoop 28. A hinge 37 has one of its arms attached to the horizontal flange of the member 36 and its other arm welded or otherwise secured to the upper extremity of a vertical hinged brace 38, 39. The lower extremity of the brace is hinged as at 40 to the bottom 22 of the container near the end thereof. The arms 38 and 39 of the brace are pivoted together as shown at 41, the pivot lying substantially in the plane of the arm 39 but being at the extremity of a short offset 42 on the end of the arm 38. A triangular stop 43 is welded or otherwise attached to or formed on the extremity of the arm 38 to abut against the adjacent end of the arm 41 to stop the arm 38 from counterclockwise motion relative to the arm 39 beyond the position shown in Fig. 3. One or more appropriately formed spring members 44 partially encircle the barrel of the hinge 41 and have their extremities pressing against the arms 38 and 39 in such a way as to tend to press the stop 43 against the arm 39. The ends of the springs 44 may be welded or otherwise attached to the arms 38 and 39.

In Fig. 3 it will be noted that the pivot 41 lies to the right of a straight line through pivots 37 and 40 so that arms 38 and 39 form a toggle hinge which in Fig. 3 is slightly overthrown and if the end wall 23 be under tension will yieldably tend to resist closing into the position of Fig. 4.

Preferably the mechanism comprising the toggle hinge 38, 39 and its associated elements is repeated at the other end of the container as also the link and slide mechanism 32, 33. The arms 38 and 39 are preferably of a broad shallow channel conformation, this being both light and rigid.

The lid 21 is further provided around the periphery of its under face with a combined buffer and seal 45 of rubber or other appropriate material shown in Figs. 2 and 3 as cemented to the lid 21, but which might be mechanically held in an appropriate groove or channel formed in the lid as shown in Fig. 4.

A spring catch 46 is riveted or otherwise secured to the bottom 22 and has an arm spaced from and extending upward along the end wall 23. The catch has a barbed head 47, one barb of which is adapted to be pressed into a corresponding notch 48 in the end flange 30 of the lid 21 when the container is collapsed as shown in Fig. 4. Preferably this catch mechanism is duplicated at the other end of the container also as indicated in Fig. 1.

A lock 49 of any approved construction may be installed to lock the lid 21 when closed.

A ring 50 is pivotally secured to the middle of the rear of the hoop 28. When suitcases or other articles having handles or other loops 53 are carried in the container a chain 51 may be passed through the handles or other loops thereon and through the ring 50 and fastened as with a padlock 52, to prevent theft by slitting the flexible walls from the outside and removing the articles through the slit.

The container in its expanded condition ready for use is disclosed in Figs. 1, 2 and 3. When there is no occasion for use, if the lid be raised and the pivots 41 be pushed toward the center of the container, the latter may be collapsed as shown in Fig. 4. The flexible side walls are folded inwardly along both the sides and ends of the container. At the ends, the offset 42 on the arm 38 allows the wall material to lie between the arms 38 and 39 without danger of being sheared or pinched thereby. The hoop 28 abuts all around against the band 25 with two plies of the side wall therebetween. The lid 20 rests down on the rim of the hoop with the rubber buffer 45 interposed. The catches 46 hold the whole substantially rigidly together thus preventing play and chafing as well as rattling.

The container thus collapsed has the same length and breadth as when open, but only a fraction of the same height and is easily and conveniently portable as by means of an ordinary shawl strap, or if desired a handle 54 for that purpose may be secured permanently to the flange 30 or elsewhere.

Figure 6:
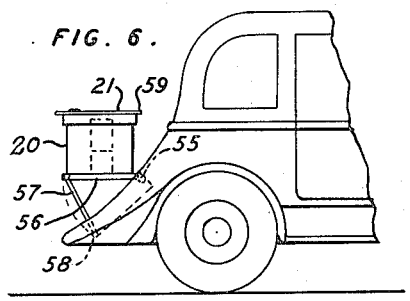
Fig. 6 is a similar view with the container expanded.
Figure 12:
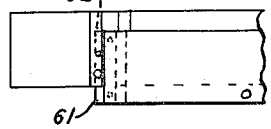
Fig. 12 is a partial plan view thereof.
Figure 11:
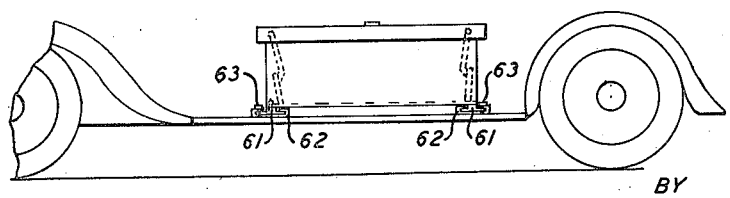
Fig. 11 is a view of the container as mounted on a running board.

Such a container may be usefully and conveniently combined with an automobile or other vehicle in various ways. Thus in the case of an automobile having the "streamlined" form of body with a sloping rearward extension the container may be permanently but pivotally attached to the body of the car as shown in Figs. 5 and 6. In this case the body of the car is formed with a recess 55 adapted and proportioned to just conveniently receive the container in its collapsed state together with a supporting base and struts therefor. A flat base 56 is pivotally attached to the upper wall of the recess. Supporting struts 57 may be pivoted to the underside of the base at its outer edge and be provided with snaps (not shown) to fasten their lower extremities detachably to the floor of the recess at 58. On this base is mounted a container constructed as above described. The container may be permanently attached to the base, as by rivets or bolts through the bottom and the base, or may be detachably secured to the base by such means as shown in Figs. 11 and 12 to be hereinafter described, or by other means.

The lid of the container may preferably be formed with an overhanging rim 59 and may be finished to match the body of the car. Thus when permanently installed the top will weather to the same degree as the car body itself and remain inconspicuous.

Figure 7:
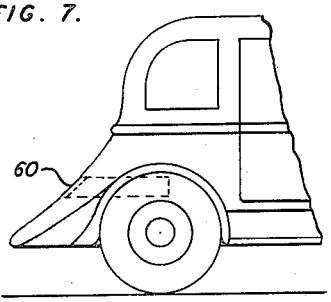
Figs. 7 and 8 are views analogous to Figs. 5 and 6 of another form.
Figure 8:
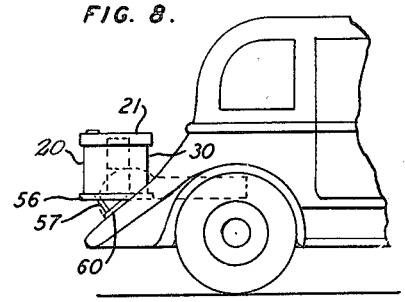

In Figs. 7 and 8, the collapsed container instead of folding into a recess in the car is arranged to slide into such a recess as a drawer does into an article of furniture. This arrangement is shown applied to a streamline body, but could also be equally well applied with slight modification of the older type of undercut body. In this case the base 56 is slidably secured in any approved way and detachable supporting struts 57 and a hinged cover 60 are also provided.

Figure 9:
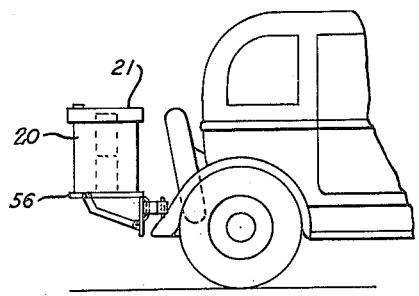
Figs. 9 and 10 are views analogous to Figs. 6 and 5 of a third form.
Figure 10:
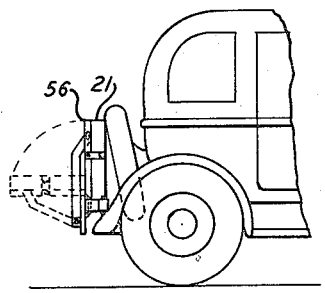

In Figs. 9 and 10 the container is shown applied in non-disappearing fashion to a folding support carried on the rear bumper of a car. When not in use, the collapsed container and its support may be folded up out of the way as shown in dotted lines in Fig. 10.

The details of construction of the folding and sliding supports shown in Figs. 5 to 10 inclusive are not disclosed or described in detail since these are mere matters of adaptation of any one of many approved analogous constructions. Thus the drawer construction found in many modern document filing cabinets would serve excellently well for the support in Figs. 7 and 8. There are many folding luggage racks on the market which could be used in Figs. 9 and 10, while the structure used as shown in Figs. 5 and 6 is too simple to require detailed description.

In Fig. 11 a container of relatively long and narrow proportions is shown detachably mounted on the running board of a car. Here a pair of pieces of T bar are attached as shown at 61 transversely across the underside of the bottom of the container, one near either end thereof, in parallel relation to each other. To the running board of the car is attached a corresponding pair of undercut grooved channel bars 62 into which the T bars are slidingly inserted. Each T bar is singly perforated near the center of its outer flange.

When the container is collapsed it may be pushed in to abut the rise of the car at the inner side of the running board, as shown in dotted line in Fig. 12, but owing to the outward bulge of the body higher up customary in most cars, when the container is expanded it must be moved outwardly a little distance. Hence each channel bar 62 is provided with two perforations, one of which is aligned with the perforation of the T bar in one position of the container and the other in the other. A pin or screw 63 may then be passed through each pair of matched perforations to lock the container in place.

Thus when on tour, if the container is used as a trunk it may be easily detached and removed with its contents to its owner's lodging; while if it is acting as a luggage carrier it may be left in place and its contents removed.

The disclosures of the invention herein are illustrative merely and may be modified and departed from in many ways without departing from the scope and spirit of the invention as pointed out in and limited only by the appended claims.

What is claimed is:

1. In a collapsible container having a bottom, flexible side walls terminating upwardly in a rigid hoop, and a top attached to the hoop, means to maintain the bottom and the hoop collapsibly spaced apart comprising an overthrowable toggle hinge having one straight arm and one arm offset therefrom at the pivot of the hinge to provide space between the arms when collapsed to receive the side walls, and a stop member on one of the arms to abut against the other arm when the opened hinge is slightly overthrown.

2. In a collapsible container having two members normally braced apart, collapsible means to hold the members apart comprising an overthrowable toggle hinge having one straight arm and one arm with an offset lug thereon and a pivot pin journalled in one end of the straight arm and in the offset lug of the other arm, and a stop mounted on one arm to abut against the other arm and thereby prevent the hinge from being overthrown beyond a slight degree.

DE HART G. SCRANTOM.